United States Patent [19]
Raith et al.

[11] Patent Number: 6,073,005
[45] Date of Patent: Jun. 6, 2000

[54] SYSTEMS AND METHODS FOR IDENTIFYING EMERGENCY CALLS IN RADIOCOMMUNICATION SYSTEMS

[75] Inventors: Alex K. Raith, Durham; Gregory E. Bottomley, Cary; John Diachina, Garner, all of N.C.

[73] Assignee: Ericsson Inc., Research Triangle Park, N.C.

[21] Appl. No.: 08/839,860

[22] Filed: Apr. 22, 1997

[51] Int. Cl.[7] .................................. H04H 7/04; H04Q 7/32
[52] U.S. Cl. ......................... 455/404; 455/521; 379/45; 379/37; 379/67.1
[58] Field of Search .................... 455/404, 521; 379/45, 37, 67.1

[56] References Cited

U.S. PATENT DOCUMENTS

| | | | |
|---|---|---|---|
| 4,878,236 | 10/1989 | Ray et al. | 379/37 |
| 4,924,491 | 5/1990 | Compton et al. | 379/37 |
| 5,175,867 | 12/1992 | Wejke et al. | 455/33.1 |
| 5,327,144 | 7/1994 | Stilp et al. | 342/387 |
| 5,353,332 | 10/1994 | Raith et al. | 379/59 |
| 5,499,386 | 3/1996 | Karlsson | 455/33.2 |
| 5,563,931 | 10/1996 | Bishop et al. | |
| 5,602,901 | 2/1997 | Redden et al. | 455/404 |
| 5,631,950 | 5/1997 | Brown | 379/67.1 |
| 5,742,666 | 4/1998 | Alpert | 455/404 |
| 5,805,670 | 9/1998 | Pons et al. | 379/45 |

FOREIGN PATENT DOCUMENTS

| | | |
|---|---|---|
| 0 679 041 A2 | 10/1995 | European Pat. Off. . |
| 0 717 574 A2 | 6/1996 | European Pat. Off. . |
| WO 94/29995 | 12/1994 | WIPO . |

OTHER PUBLICATIONS

Louis A. Stilp, "Time Difference of Arrival Technology for Locating Narrowband Cellular Signals", Proceedings of the SPIE, vol. 2602, pp. 134–144 (1996).

*Primary Examiner*—Daniel S. Hunter
*Assistant Examiner*—Alan T. Gantt
*Attorney, Agent, or Firm*—Burns, Doane, Swecker & Mathis, L.L.P.

[57] ABSTRACT

The handling of emergency calls, e.g., 911 calls, should be performed on an expedited basis. In radiocommunication systems, knowledge by the mobile unit that an emergency call is being placed can be used to expedite and optimize emergency call handling. Various techniques are described herein to identify emergency calls when placed by a mobile user. Moreover, the provision of auxiliary alarm functions for the mobile unit are also described.

22 Claims, 5 Drawing Sheets

SYSTEMS AND METHODS FOR IDENTIFYING EMERGENCY CALLS IN RADIOCOMMUNICATION SYSTEMS

BACKGROUND

Applicants' invention relates generally to radiocommunication systems, e.g., cellular or satellite systems and, more particularly, to techniques for supporting and enhancing emergency calling procedures in such systems.

The growth of commercial radiocommunications and, in particular, the explosive growth of cellular radiotelephone systems have changed the ways in which people communicate. One survey indicates that about 80% of the people who purchase mobile communication units and service subscriptions do so to enhance their personal security. Presumably, many of these subscribers would expect to use their mobile units to aid them in urgent situations, e.g., when their vehicle has become disabled or in an emergency situation requiring rapid medical and/or police response. However, it may be desirable to process emergency calls differently from non-emergency calls. For example, it may be desirable that access to the radiocommunication system be as fast as possible so that an emergency service center can respond quickly to the user's request for assistance or that the emergency service center be provided with location information which pinpoints the position of the emergency caller.

To aid in adjusting the processing of emergency calls, it may be useful that the mobile unit be able to recognize when a user is placing an emergency call so that the mobile unit can modify its normal call processing procedures. Examples of ways in which the mobile station might adjust its normal call processing procedures when it recognizes that an emergency call has been placed are described in U.S. patent application Ser. Nos. 08/839,859 (Attorney Docket No. 027575-062) and 08/843,752 (Attorney Docket No. 027575-063), entitled "Systems and Methods for Handling Emergency Calls in Hierarchical Cell Structures" and "Systems and Methods for Increasing Emergency Call Access Speed in Radiocommunication Systems", respectively, both of which were filed on Apr. 22, 1997. Of course those skilled in the art will appreciate that other mobile unit call processing routines could also be adjusted to optimize emergency call handling once the placement of such a call has been recognized.

Moreover, some systems provide mechanisms for the mobile unit to alert the system of a request for emergency access independent of the dialed number. For example, systems defined by IS-136 provide a field in the Origination Message wherein a bit flag can be set when the mobile station recognizes that an emergency access has been requested.

SUMMARY

According to exemplary embodiments of the present invention, various techniques are described for identifying, in a mobile unit, when a user wants to initiate an emergency call. In one embodiment, a special key on the mobile unit is provided for emergency indications. When pressed, the mobile unit may place a call to an emergency service center. Alternatively, or additionally, this special key can serve as a "panic" button which, when pressed, results in one or more of a plurality of alarm functions being performed. Instead of a special key, a predetermined key sequence can be defined for the mobile unit that provides the same functionality as the special key embodiments.

Techniques for identifying a dialed number as an emergency call are also described. A data base of emergency numbers can be provided against which a dialed number is compared. Alternatively, the emergency number associated with a particular country or region may be broadcast by the system, which broadcast number can then be used by the mobile unit to identify and place emergency calls. Moreover, the mobile unit may use a determination of a current country of operation to aid the user in selecting an appropriate emergency number for transmission.

BRIEF DESCRIPTION OF THE DRAWINGS

The features and advantages of Applicants' invention will be understood by reading this description in conjunction with the drawings, in which.

DETAILED DESCRIPTION

Figure 1:
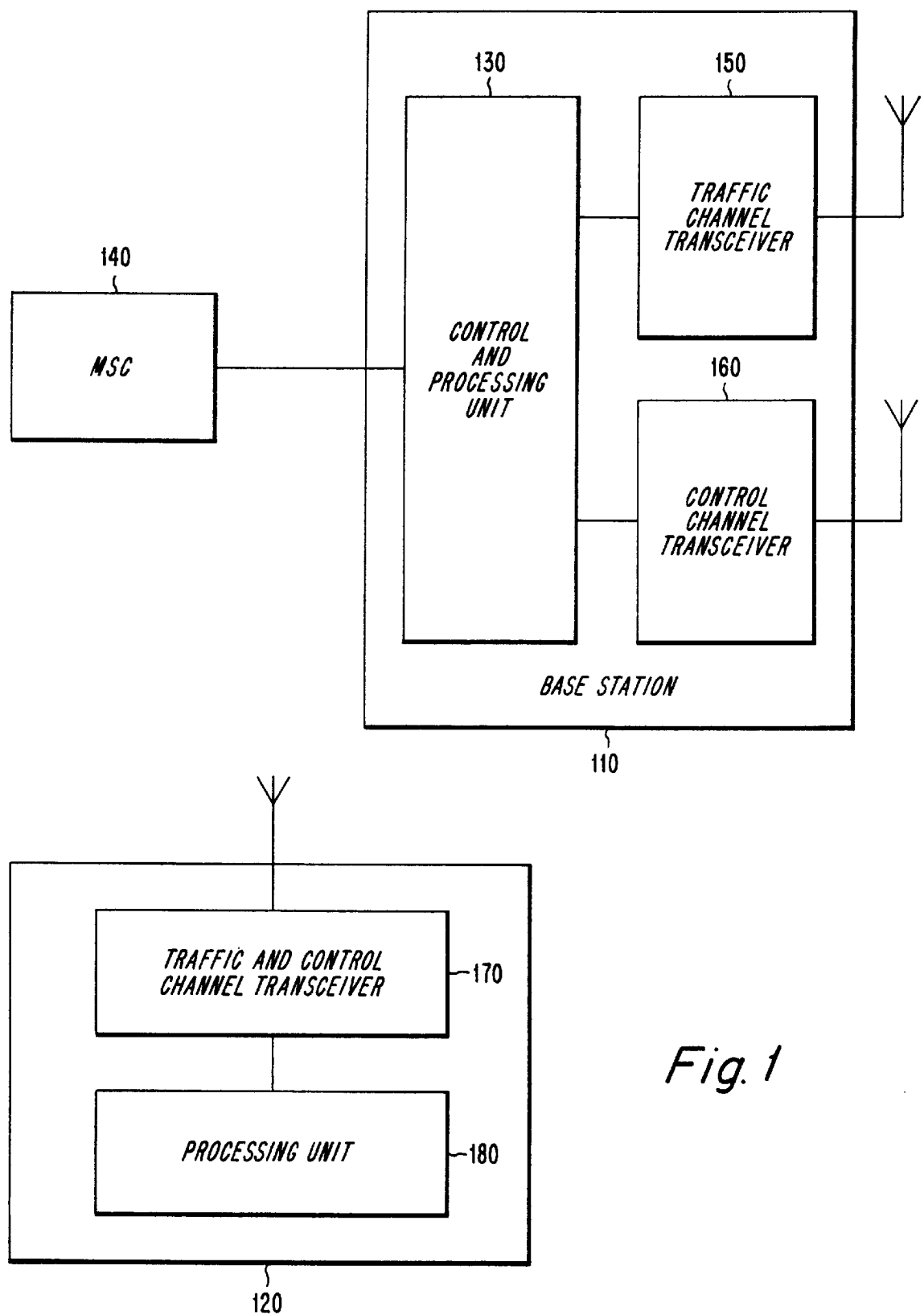
FIG. 1 illustrates an exemplary base station and mobile unit which may operate in accordance with the present invention.

The following description is scripted in terms of a cellular radiotelephone system, but it will be understood that Applicants' invention is not limited to that environment and may be used in other types of wireless systems, e.g., systems which provide radiocommunication service using satellites, voice-trunked systems such as Land Mobile Radio (LMR) or Special Mobile Radio (SMR) systems, etc. Also, while the exemplary embodiments described below are provided in the context of Time Division Multiple Access (TDMA) communication systems, and in particular IS-136, it will be understood by those skilled in the art that the present invention may be applied to systems using any access methodology, e.g,. Frequency Division Multiple Access (FDMA), Code Division Multiple Access (CDMA) and hybrids of FDMA, TDMA and/or CDMA, as well as those which are defined by any system standard, e.g., GSM, PDC, AMPS, etc.

Consider, solely for the purposes of example, the prevalent digital cellular radiotelephone system in North America known as the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry Association (EIA/TIA). Because of a large existing consumer base of equipment operating only in the analog domain with frequency-division multiple access (FDMA), IS-54B is a dual-mode (analog and digital) standard, providing for analog compatibility in tandem with digital communication capability. For example, the IS-54B standard provides for both FDMA analog voice channels (AVCs) and TDMA digital traffic channels (DTCs), and the system operator can dynamically replace one type with the other to accommodate fluctuating traffic patterns among analog and digital users. The AVCs and DTCs are implemented by frequency modulating radio carrier signals, which have frequencies near 800 megahertz (MHz) such that each radio channel has a spectral width of 30 kilohertz (KHz).

The IS-54-B standard also provides for a number of analog control channels (ACC) on which system accesses can be initiated and system overhead information can be communicated to the mobile units. A subsequent standard, referred to as IS-136, adds specifications for digital control channels (DCCs), which standard is incorporated here by reference.

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. According to IS-54B and IS-136, each TDMA frame consists of six consecutive time slots and has a duration of 40 milliseconds (msec). Thus, each frame can carry from one to six channels (e.g., one to six radio connections), which may be a mixture of DTCs and DCCs used to convey information between a base station and a mobile station.

FIG. 1 represents a block diagram of an exemplary cellular mobile radiotelephone system, including an exemplary base station 110 and mobile unit 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. patent application Ser. No. 07/967,027 entitled "Multi-Mode Signal Processing," which was filed on Oct. 27, 1992, both of which are incorporated in this application by reference.

The base station 110 handles a plurality of traffic channels through a traffic channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the traffic and control transceiver 170 in the mobile station, for use with control channels and traffic channels that share the same radio carrier frequency.

After an idle mobile unit 120 has located a control channel, e.g., by using digital control channel location information found on a traffic channel, it can then read the control information transmitted on that control channel, e.g., paging messages, using its traffic and control channel transceiver 170. For more detailed information relating to techniques for locating digital control channels, the reader is referred to U.S. patent application Ser. No. 08/331,711 entitled "Method and Apparatus for Locating a Digital Control Channel in a Radiocommunication System", filed on Oct. 31, 1994, the disclosure of which is incorporated here by reference. When a connection between the mobile station 120 and the system is desired, the transceiver 170 will tune to a traffic channel assigned thereto by the system.

According to the present invention, the mobile unit 120 will determine if the user has provided input indicating that an emergency call is to be placed so that it can categorize the call as emergency or non-emergency and take appropriate action, e.g., modify its call handling procedures as described above.

Figure 2:
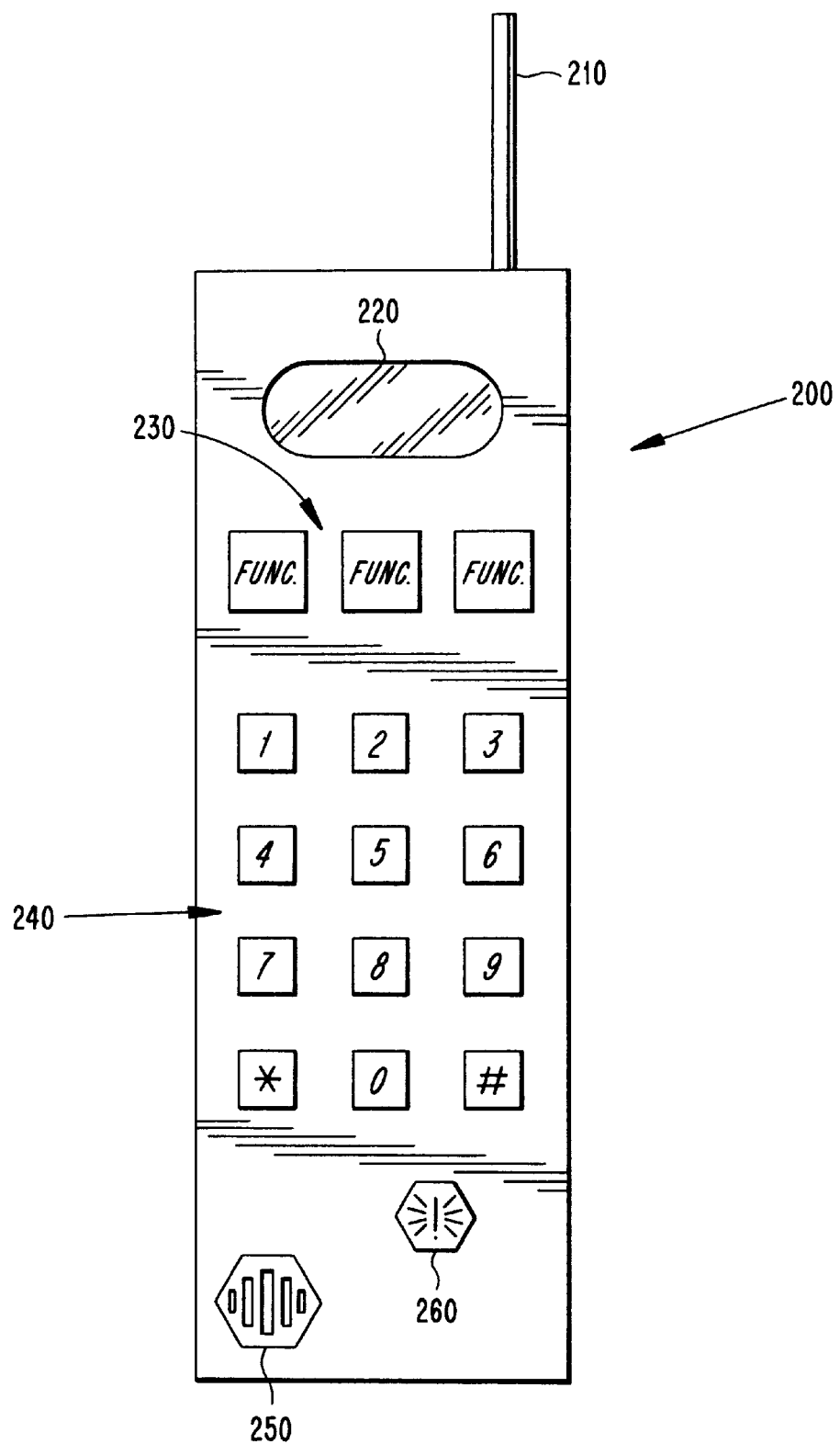
FIG. 2 illustrates an exemplary mobile unit according to the present invention in more detail.

According to a first exemplary embodiment, a special button or key can be provided on the mobile unit that is associated with emergency calls. FIG. 2 illustrates an exemplary mobile unit 200 having an antenna 210, display 220, various function keys 230, a keypad 240, microphone 250 and emergency key 260. The emergency key 260 can be positioned in portion of the mobile unit housing that is spaced from the keypad and may be shaped differently from the other keys to reduce inadvertent depression of this key.

The emergency key 260 can be used in a variety of different implementations to achieve various results. For example, pressing the emergency key 260 may result in a predetermined number being dialed and transmitted by the mobile unit. This number may be an emergency number, e.g., 911, or it may be the number of a spouse or service operator. The number associated with emergency key 260 may be programmed into the mobile unit 200 by the mobile user. Alternatively, the number may be an emergency number which is broadcast by the system over the air interface, e.g., over a broadcast control channel. If a country or region has multiple emergency numbers, e.g., a high priority emergency number requiring urgent medical and/or police response and one or more lower priority emergency numbers, then each of these numbers can be broadcast by the system. For example, the system might define 911 for emergencies, 811 for road assistance and 711 for other, lower priority situations. This latter exemplary implementation has the added benefit that as the mobile unit roams, especially internationally, the mobile user need not keep track of changes in the local emergency number. In addition to a number being dialed and transmitted, the mobile unit 200 may also transmit one or both of its own phone number (e.g., so that a return call can be placed should the initial connection be lost) and its location (e.g., if the mobile unit is connected to a GPS receiver).

Other functions can also be linked to the emergency key 260. For example, this key can function as a "panic button", such that an alarm or other acoustic emission is generated from microphone 250 when this button is depressed. Similarly, the display 220 can output a predetermined message (e.g., "EMERGENCY") and flash. Any combination of the foregoing described functions may be selected by a user and/or at the factory and programmably associated with emergency key 260.

However, as mobile units become smaller and smaller, there is significant pressure on mobile unit designers to reduce the number of keys which are provided on a mobile phone. Thus, it may be not be desirable to add a special emergency key. Under these circumstances, a special key sequence could be designated which, when input by the user, would result in one or more of the above described functions being performed. Preferably, the designated key sequence would be distinguishable from dialable numbers, e.g., "*#911#".

As an alternative, or in addition, to providing a special key or key sequence for indicating an emergency condition, it may also be desirable that the mobile unit 200 be able to evaluate a dialed number input by user to identify emergency call placement. Perhaps the best known emergency number in the United States is 911. However, even within the United States there are other emergency numbers (e.g. that associated with the U.S. Virgin Islands). Moreover, recent trends indicate a surge in the usage of 911 calls for relatively low-priority emergencies, which trends have led to discussions of adding one or more other low-priority emergency numbers (e.g., 811) to reduce the load on emergency centers and reduce response time for more urgent situations.

Thus, one possibility for identifying emergency calls is to provide the mobile unit with a data base having all possible emergency call numbers. This data base can be stored in a memory device (not shown) within the mobile unit either at manufacturing or can be downloaded later as part of, for example, the Over the Air-interface Teleservice (OATS) defined in IS-136. For GSM systems, the Subscriber Interface Module (SIM) card can contain this data base. Then, each time a number is dialed into the mobile unit 200 using keypad 240, that number can be compared with the data base or list of emergency numbers to determine if the call is an emergency call.

This technique is somewhat complicated by the consideration that a user may travel to a different country or region which uses different numbers for emergency calls than those used in its home country or region. Thus, it may be desirable to group the emergency numbers by country or region in the data base and provide the mobile unit with information as to the country or region in which it is currently operating so that a comparison is made with an appropriate group of emergency numbers in the data base.

Figure 3:
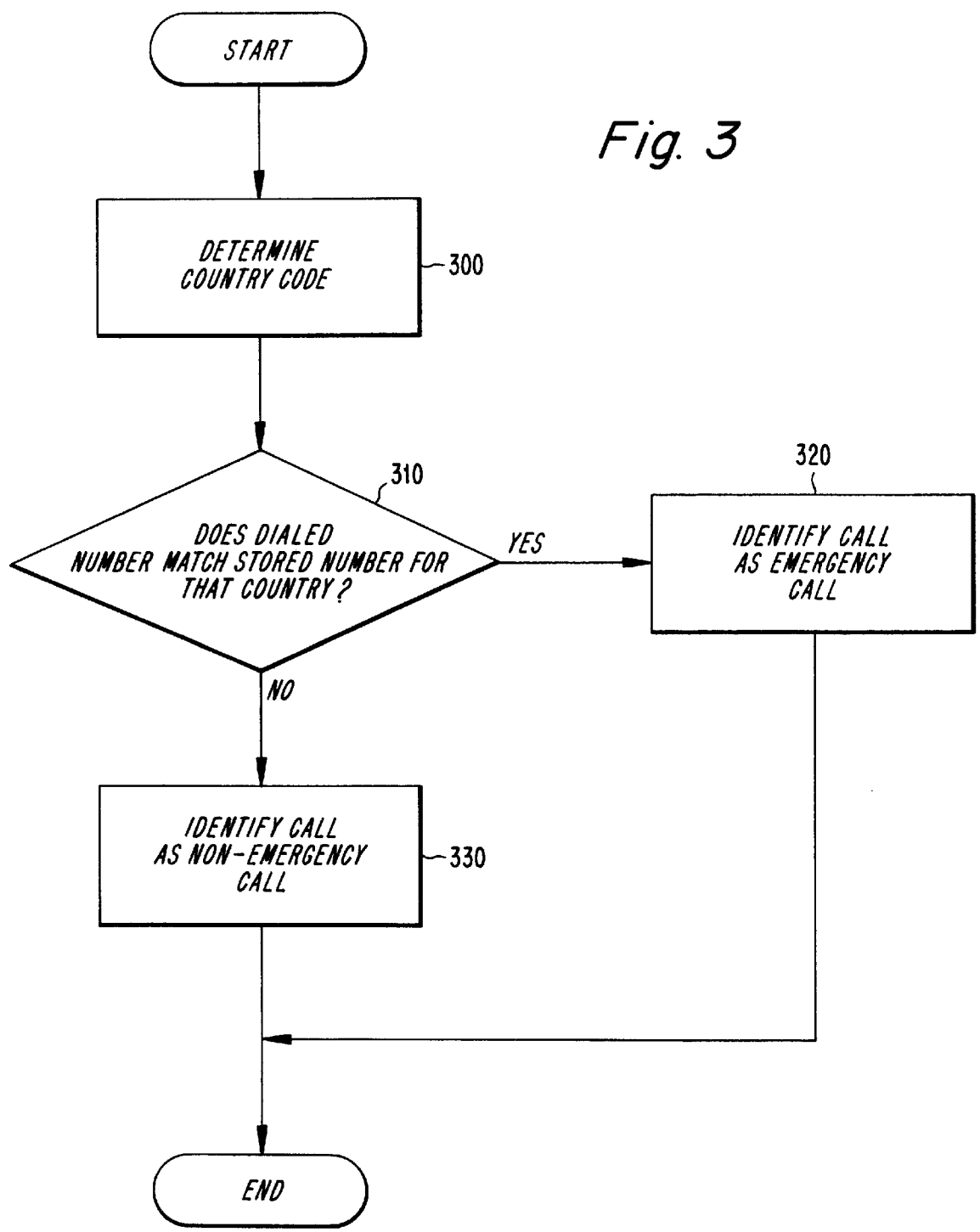
FIG. 3 is a flow chart illustrating a method for identifying an emergency call according to an exemplary embodiment of the present invention.

For example, as illustrated in the flow chart of FIG. 3, the mobile unit can determine the country in which it is located, in some systems, by reading the country code sent on the broadcast channel as shown in block 300. Then, if a number entered by the user matches one of the stored numbers and this stored number has an associated country code equal to that currently sent on the broadcast control channel at step 310, the mobile unit determines this call to be an emergency call (block 320). Otherwise the call is identified as a non-emergency call at block 320.

Figure 4:
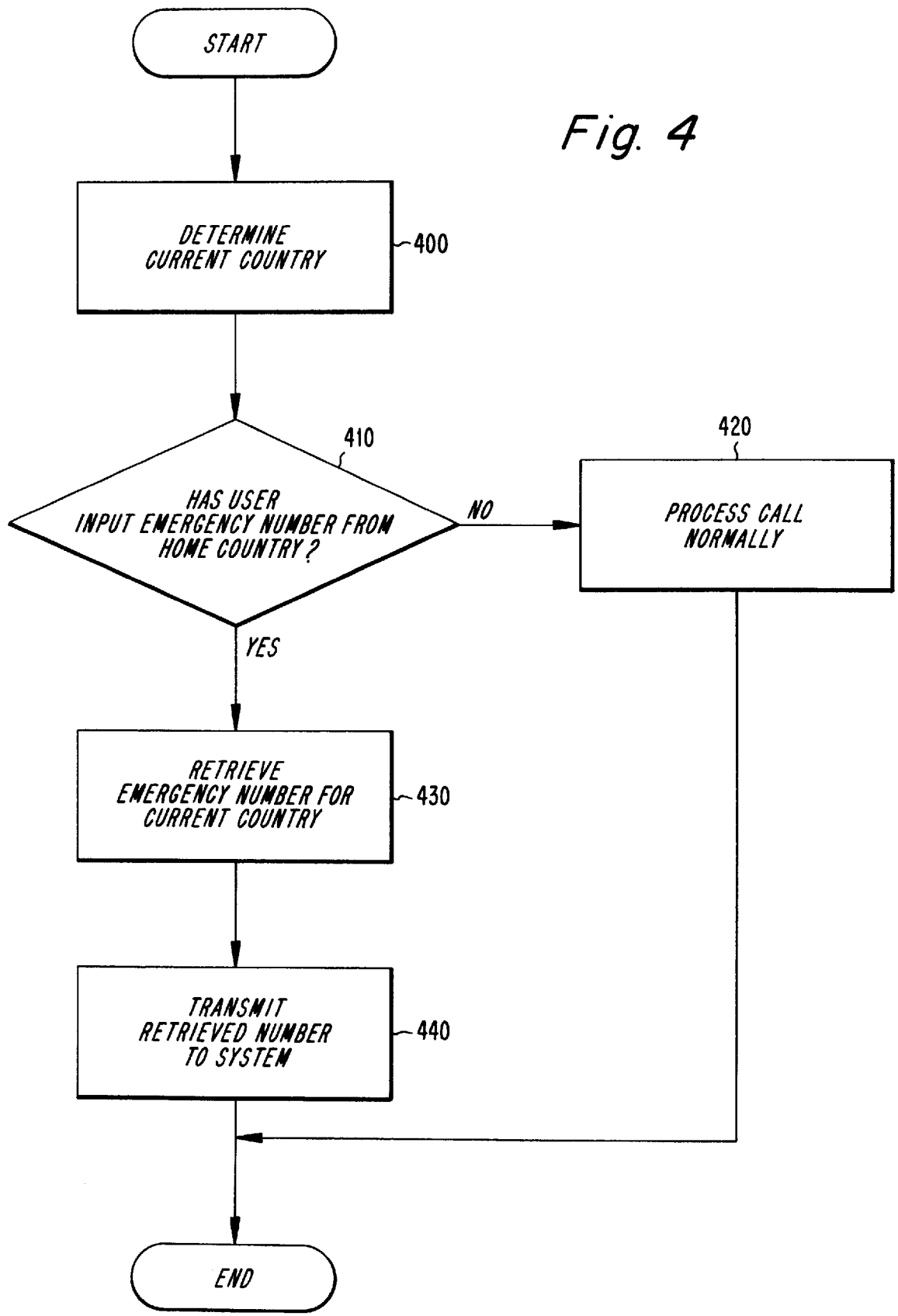
FIG. 4 is a flow chart illustrating a method for replacing a home emergency call number with a local emergency call number according to a second exemplary embodiment of the present invention.

Alternatively, the mobile unit can be programmed so that the user need only know an emergency number in his or her home country. For example, with reference to the flowchart of FIG. 4, the mobile unit can track the current country of in which it is operating at block 400, e.g., by information provided by the system over the air interface. Then, when the user inputs a number, the mobile station can compare that number with the emergency number(s) from his or her own country, e.g., 911, at block 410. If some other number has been dialed, then the flow proceeds to block 420 where the call is processed normally. If the user has dialed an emergency number from his or her own country, then the flow proceeds to block 430 where the mobile unit uses the current country code to index the stored data base of numbers and substitute the correct emergency number for, e.g., 911, when the user has roamed to a different country or region having a different emergency number. Moreover, as described above, the emergency number is broadcast by the system, then the mobile unit could simply store the broadcast number and replace the user's dialed home emergency number with the broadcast number. Then, at block 440, the correct emergency number is transmitted (and the call is identified as an emergency call for subsequent processing changes, if any).

Figure 5:
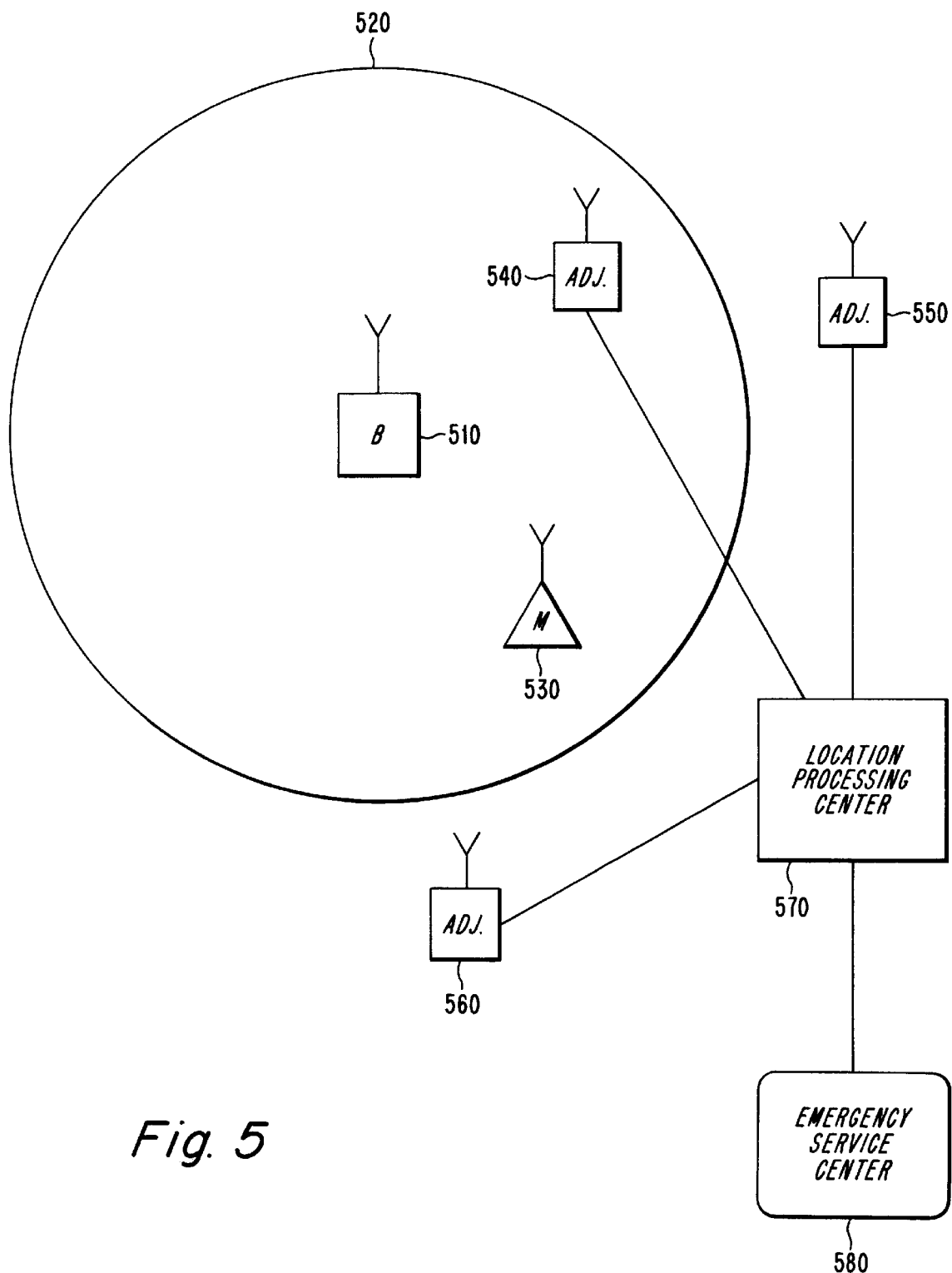
FIG. 5 is an illustration of a radiocommunication system having an adjunct monitoring system.

System broadcast information can be further enhanced to support emergency calling. In support of emergency calls, it may be desirable to provide a mechanism for pinpointing the position of an emergency caller. One technique for locating mobile units in radiocommunication systems involves the provision of an adjunct system, i.e., a system may be completely independent of the radiocommunication system or which may share various components (e.g., an antenna) with the radiocommunication system but which processes signals separately therefrom. This may be advantageous, for example, as an expedient solution to providing mobile unit location without modifying the large number of existing base stations in a system. For example, consider the equipment illustrated in FIG. 5 wherein the adjunct scanning units are not co-located with the base stations of radiocommunication system. Therein, a base station 510 supports radiocommunication within cell 520 and, in particular with mobile unit 530. An adjunct system, partially shown by way of scanning units 540, 550 and 560, monitors accesses to the system by mobile unit 530. When mobile unit 530 makes an emergency access, adjunct units 540, 550 and 560 use the mobile unit's transmissions on either a control channel or a traffic channel to provide information to a location processing center 570. The location processing center then uses the information provided by the various adjunct units to, for example, triangulate the position of mobile unit 530 and report this position to an emergency service center 580. More details regarding exemplary usages of adjunct systems can be found in U.S. Pat. No. 5,327,144 to Stilp et al., entitled "Cellular Telephone Location System", the disclosure of which is incorporated here by reference.

In these types of systems, there may be no communication between the cellular system and the adjunct system. Moreover, there may be no one-to-one correspondence between the cells in the cellular system and the adjunct scanning units in the adjunct system, such that the physical location of a measurement device may not necessarily indicate which emergency service center should be used to handle an emergency access for a particular mobile unit. This poses additional problems in the handling of emergency calls.

For example, consider an emergency call that occurs at some time T1. After the adjunct system processes received signals from the mobile unit making a call, it will be able to provide location information associated with that mobile station at some later time T2. Under these circumstances, the adjunct system needs to then determine to which (of potentially many) emergency service center it should forward the position location information.

One solution is to use the estimated position of the mobile unit in conjunction with a data base stored in the adjunct system to determine which emergency center is appropriate for sending information (e.g., location information) regarding that mobile unit. The data base may identify regions of coverage for each emergency center.

According to another exemplary embodiment of the present invention, in the radiocommunication system (e.g., the cellular system) each cell can broadcast an identity of its associated emergency service center. In this way, the adjunct scanning units will also acquire this information during their monitoring of emergency call accesses and can then forward information to the identified emergency service center. The identity of the associated emergency service center can, for example, be broadcast on the control channel or can be included as information in the traffic channel assignment message used to provide the emergency caller with a traffic channel over which the emergency message is transmitted in the uplink.

After the user has requested an emergency call, it will typically take a few seconds to set up the call, i.e., to assign and connect to the system via a traffic channel. The radiocommunication system can send progress messages to the mobile unit which are displayed to the user. For example, a special alert message can be used to acknowledge that the radiocommunication system is in the process of handling the emergency call. If the message protocol of the radiocommunication system allows, the system can send a message which results in the mobile unit displaying an icon indicating that an emergency call is in progress. Thus, text, symbols and predefined alert signals can be used. These techniques can be invoked to inform the user or can trigger the mobile unit to play a stored recording to the user.

It is, of course, possible to embody the invention in specific forms other than those described above without departing from the spirit of the invention. Thus, the embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A method for identifying a call as an emergency call in a radiocommunication system comprising the steps of:
    storing a data base of emergency call numbers;
    grouping said emergency call numbers by country;
    receiving an identification of a country in which a remote unit is currently operating;
    comparing a dialed number with emergency call numbers stored in a group in said data base associated with said received identification; and
    selectively identifying a call associated with said dialed number as an emergency call based on a result of said comparison.

2. The method of claim 1, wherein said step of storing further comprises the step of:
    receiving over an air interface said emergency call numbers.

3. A method for transmitting an emergency call in a radiocommunication system comprising the steps of:
    storing a data base of emergency call numbers in a wireless communication device;
    grouping said emergency call numbers by country;
    receiving at said wireless communication device an identification of a country in which a remote unit is currently operating;
    comparing a dialed number with a home emergency call number stored in said data base;
    replacing said dialed number with an emergency number associated with said country using said data base and said identification when said dialed number and said home emergency call number match; and
    transmitting said emergency call using said emergency number.

4. The method of claim 3, wherein said step of storing further comprises the step of:
    receiving over an air interface said emergency call numbers.

5. A method for transmitting an emergency call in a radiocommunication system comprising the steps of:
    transmitting an emergency number associated with a geographical region over an air interface;
    receiving and storing, at a remote station, said transmitted emergency number;
    receiving a predetermined input from a user of said remote station, subsequent to said step of storing said transmitted emergency number; and
    initiating an emergency call using said stored emergency number in response to said predetermined input.

6. The method of claim 5, wherein said predetermined input includes pressing a special emergency key on said remote station.

7. The method of claim 5, wherein said predetermined input includes pressing a predetermined key sequence on said remote station.

8. A method for handling emergency calls in a radiocommunication system, comprising the steps of:
    transmitting, from said system, an emergency service center identifier on a downlink channel;
    receiving, at a monitoring station of an adjunct system, said emergency service center identifier; and
    transmitting, from said adjunct system, location information associated with a mobile unit using an uplink channel associated with said downlink channel to an emergency service center identified by said identifier.

9. A radiocommunication device comprising:
    a data base of emergency call numbers, wherein said emergency call numbers are grouped by country;
    a receiver for receiving an identification of a country in which said radiocommunication device is currently operating; and
    a processor for comparing a dialed number with emergency call numbers stored in a group in said data base associated with said received identification and for selectively identifying a call associated with said dialed number as an emergency call based on a result of said comparison.

10. The radiocommunication device of claim 9, wherein said receiver receives said emergency call numbers over an air interface.

11. A radiocommunication device comprising:
    a data base of emergency call numbers grouped by country;
    a receiver for receiving an identification of a country in which said radiocommunication device is currently operating;
    a processor for comparing a dialed number with a home emergency call number stored in said data base and for replacing said dialed number with an emergency number associated with said country using said data base and said identification when said dialed number and said home emergency call number match; and
    a transmitter for transmitting said emergency call using said emergency number.

12. The radiocommunication device of claim 11, wherein said receiver receives said emergency call numbers over an air interface.

13. A radiocommunication system for transmitting an emergency call comprising:
    a first transceiver for broadcasting an emergency number associated with a geographical region over an air interface;
    a second transceiver for receiving and storing, at a remote station, said broadcast emergency number; and
    wherein said second transceiver transmits an emergency call using said stored emergency number in response to a predetermined input from a user of said remote station.

14. The system of claim 13, wherein said predetermined input includes pressing a special emergency key on said remote station.

15. The system of claim 13, wherein said predetermined input includes pressing a predetermined key sequence on said remote station.

16. A radiocommunication system for handling emergency calls comprising:
- a first transceiver for transmitting, from said system, an emergency service center identifier on a downlink channel;
- a receiver for receiving, at a monitoring station of an adjunct system, said emergency service center identifier; and
- a transmitter for transmitting, from said adjunct system, location information associated with a mobile unit using an uplink channel associated with said downlink channel to an emergency service center identified by said identifier.

17. The method of claim 8, further comprising the step of:
broadcasting said emergency service center identifier on a control channel.

18. The method of claim 8, further comprising the step of:
transmitting said emergency service center identifier as information in a traffic channel assignment message.

19. The radiocommunication system of claim 16, wherein said first transceiver transmits said emergency service center identifier on a control channel.

20. The radiocommunication system of claim 16, wherein said first transceiver transmits said emergency service center identifier as information in a traffic channel assignment message.

21. The method of claim 5, further comprising the step of:
transmitting, from said radiocommunication system, an alert message to acknowledge that the radiocommunication system is handling said emergency call.

22. The method of claim 5, further comprising the step of:
transmitting progress message to said remote station and outputting said progress messages to a user of said remote station.

* * * * *